(12) United States Patent
Semple et al.

(10) Patent No.: US 6,598,538 B2
(45) Date of Patent: Jul. 29, 2003

(54) RAIL WHEEL STOP MECHANISM FOR ROAD/RAIL VEHICLE

(75) Inventors: Jim Semple, Regina (CA); Jeff Doka, Regina (CA)

(73) Assignee: Brandt Industries, Inc., Regina (CA)

( * ) Notice: Subject to any disclaimer, the term of this patent is extended or adjusted under 35 U.S.C. 154(b) by 0 days.

(21) Appl. No.: 09/971,134

(22) Filed: Oct. 4, 2001

(65) Prior Publication Data

US 2003/0066455 A1 Apr. 10, 2003

(51) Int. Cl.7 .................................................. B61F 2/00
(52) U.S. Cl. ................ 105/215.2; 105/215.1; 280/124.116; 267/256
(58) Field of Search .......................... 105/215.2, 215.1, 105/217, 72.2, 453; 280/124.116, 754; 267/256, 64.12, 35

(56) References Cited

U.S. PATENT DOCUMENTS

| | | | | |
|---|---|---|---|---|
| 3,966,223 A | * | 6/1976 | Carr ..................... | 280/124.128 |
| 3,970,293 A | * | 7/1976 | Sweet et al. ............. | 267/31 |
| 4,077,328 A | * | 3/1978 | Taylor .................. | 105/215.2 |
| 4,342,264 A | * | 8/1982 | Hindin et al. ........... | 105/215.2 |
| 4,488,494 A | * | 12/1984 | Powell, Sr. ............. | 105/215.2 |
| 5,018,453 A | * | 5/1991 | Kinard .................. | 105/72.2 |
| 5,549,322 A | * | 8/1996 | Hauri ................... | 280/86.5 |
| 5,655,788 A | * | 8/1997 | Peaker .................. | 280/86.5 |

* cited by examiner

Primary Examiner—Mark T. Le
Assistant Examiner—Frantz F. Jules
(74) Attorney, Agent, or Firm—Frost Brown Todd LLC

(57) ABSTRACT

For use with a road/rail vehicle that is convertible from a road mode for traveling on a road, to a rail mode for traveling on rails, an apparatus for mounting a rail wheel to the vehicle. The apparatus comprises an air bag bearing against the rail wheel and the vehicle frame such that the vehicle frame is supported on the rail wheel by the air bag and such that the vehicle frame can move up and down with respect to the rail wheel in response to motion of the vehicle along a set of rails. A stop mechanism is attached to the vehicle frame and to the rail wheel and is operative to allow the vehicle frame to move down with respect to the rail wheel only to a stopped position where adjacent road wheels of the vehicle are above the rails. A kit allows installation on existing road/rail vehicles.

18 Claims, 3 Drawing Sheets

RAIL WHEEL STOP MECHANISM FOR ROAD/RAIL VEHICLE

This invention is in the field of vehicles for road and rail use and in particular the suspension of such vehicles.

BACKGROUND

Vehicles adapted for road and rail use are well known. Commonly a truck or highway tractor will include conventional rubber tired wheels for road use, and a set of rail wheels which allow the truck to travel on railway lines. Short-line railways have made such convertible highway tractors, or road/rail power units, popular for economically pulling small numbers of rail cars on low volume rail lines. Conventional railways also use them for shunting, maintenance, and like jobs where large locomotives are not required and are uneconomical. The road/rail power units are more versatile than locomotives as they allow for direct movement between rail lines on roads. Towed vehicles are also known that convert from road to rail modes.

The suspension of such vehicles typically includes some apparatus to raise and lower the rail wheels, and may further include mechanisms for raising at least some road wheels. It is necessary that those wheels of either kind that are not being used are removed from the road or rail so as not to interfere with the operation of the vehicle in the particular mode it is operating in.

Air bag suspensions are popular to support the vehicle on the rail wheels in rail mode as they allow the desired degree of movement to provide a smooth ride. Some give is desired to cushion the vehicle from variations in the track, such as uneven joints between rails. Air bags are preferred over springs as they can be collapsed to allow the rail wheels to be raised when the vehicle converts to road mode. Typically an actuator such as a hydraulic cylinder is used to move the rail wheels up into road mode and down into rail mode. The hydraulic cylinder typically extends or retracts to move the rail wheels down and then the air bag is inflated between the rail wheel and the vehicle frame to support the vehicle with adjacent road wheels raised above the rails. Pressure is then released from the hydraulic cylinder so that same floats, allowing the vehicle to move up and down with respect to the rail wheels on the cushion provided by the air bag.

Typically to convert to road mode, the air pressure in the air bag is released so that the vehicle moves down to rest on the adjacent road wheels. Some of the road wheels might also be raised when moving into rail mode. In that case, those road wheels are typically first lowered before the air pressure in the air bag is released. When the air pressure is released, the hydraulic cylinder is then reversed to raise the rail wheels into the raised road mode position, wherein the air bag is collapsed. A chain or the like is used to secure the rail wheels in the raised road mode position.

A problem with the air bag suspension is that the air bag can fail, allowing the vehicle to drop. The adjacent road wheels may then contact the rail or ties, causing damage to the vehicle or rail bed, or even derailing the vehicle.

SUMMARY OF THE INVENTION

It is the object of the present invention to provide an air bag suspension apparatus for mounting a rail wheel to a convertible road/rail vehicle that prevents adjacent road wheels of the vehicle from contacting the rails while allowing the suspension to cushion the vehicle while traveling on a set of rails in rail mode.

It is a further object of the invention to provide such an apparatus that also locks the rail wheels in a raised position for vehicle travel on a road in road mode.

It is a further object of the invention to provide such an apparatus in kit form that can be attached to existing road/rail vehicles.

The invention provides, in one aspect, for use with a road/rail vehicle, the vehicle convertible from a road mode for traveling on a road, to a rail mode for traveling on rails, an apparatus for mounting a rail wheel to the vehicle. The apparatus comprises an air bag and a source of pressurized fluid operatively connected to the air bag to supply pressurized fluid to the air bag such that the air bag bears against the rail wheel and against the vehicle frame such that the vehicle frame is supported on the rail wheel by the air bag and such that the vehicle frame can move up and down with respect to the rail wheel in response to motion of the vehicle along a set of rails. A control is operative to release pressurized fluid from the air bag. An actuator is operatively connected to the vehicle frame and to the rail wheel, the actuator operative to selectively move the rail wheel from a raised road mode position to a lowered rail mode position. A stop mechanism is attached to the vehicle frame and to the rail wheel and is operative to allow the vehicle frame to move down with respect to the rail wheel only to a stopped position; and wherein adjacent road wheels of the vehicle are above the rails in the stopped position.

The invention provides, in a second aspect, a kit for use with a road/rail vehicle, the vehicle convertible from a road mode for traveling on a road, to a rail mode for traveling on rails, the vehicle when in rail mode supported on a rail wheel by an air bag, the vehicle including a source of pressurized fluid operatively connected to the air bag to supply pressurized fluid to the air bag such that the air bag bears against the rail wheel and against the vehicle frame and such that the vehicle frame can move up and down with respect to the rail wheel in response to motion of the vehicle along a set of rails, the vehicle further including a control to release the pressurized fluid from the air bag and an actuator operatively connected to the vehicle frame and to the rail wheel, the actuator operative to selectively move the rail wheel from a raised road mode position to a lowered rail mode position. The kit comprises a stop mechanism attachable to the vehicle frame and to the rail wheel, the stop mechanism operative to allow the vehicle frame to move down with respect to the rail wheel only to a stopped position wherein adjacent road wheels of the vehicle are above the rails.

The apparatus allows the vehicle to move up and down with respect to the rail wheels so that the suspension can cushion the vehicle, while preventing the adjacent road wheels from coming into contact with the rails or rail bed should the air bag fail. The apparatus can also readily incorporate a lock to secure the rail wheels in the raised road mode position for travel on the road.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

FIGS. 2, 3, 5, and 6 illustrate, for use with a road/rail vehicle convertible from a road mode for traveling on a road, to a rail mode for traveling on rails, an apparatus 1 for mounting a rail wheel to the vehicle. The apparatus 1 comprises an air bag 2 and a conventional source of pressurized fluid (not illustrated) is operatively connected to the air bag 2 to supply pressurized air or similar fluid. A control is operative to release pressurized fluid from the air bag 2.

Figure 1:
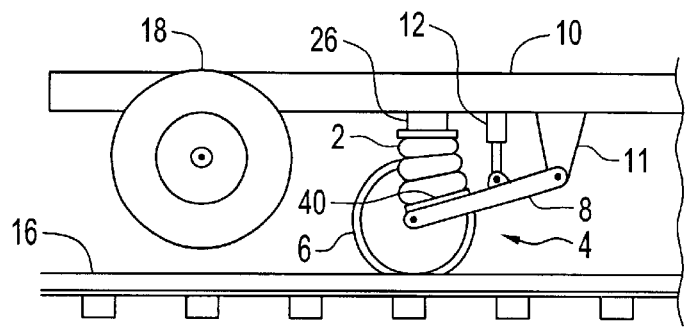
FIG. 1 is a schematic side view of a prior art suspension for a road/rail vehicle in rail mode.
Figure 2:
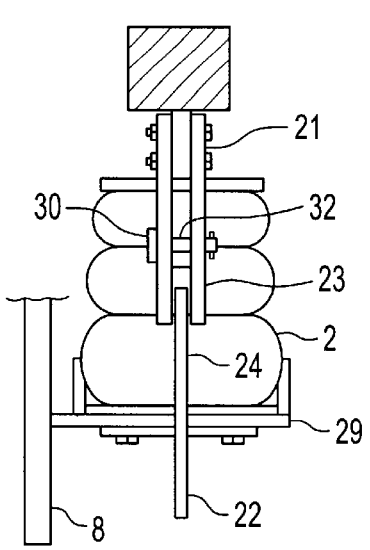
FIG. 2 is a front view of an apparatus of the invention in rail mode.
Figure 4:
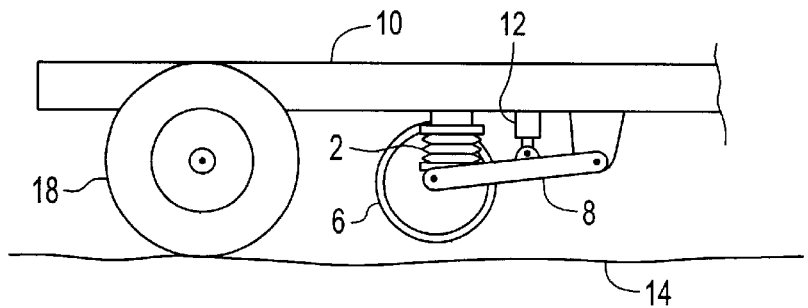
FIG. 4 is a schematic side view of a prior art suspension for a road/rail vehicle in road mode.
Figure 5:
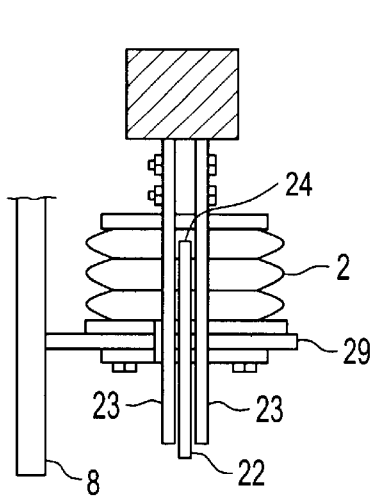
FIG. 5 is a front view of the apparatus of FIG. 2 in road mode.

A rail wheel assembly 4 includes a rail wheel 6 rotatably mounted to one end of a pivot member 8. The opposite end of the pivot member 8 is pivotally mounted to the vehicle frame 10 at frame member 11. An actuator, such as the illustrated hydraulic cylinder 12, is operatively connected to the vehicle frame 10 and to the pivot member 8 and is operative to selectively move the rail wheel 6 from a lowered rail mode position as illustrated in FIG. 1 for traveling on a set of rails 16, to a raised road mode position, as illustrated in FIG. 4 for traveling on a road 14. FIGS. 1 and 4 illustrate an example of a prior art suspension, where the air bag 2 is pressurized in FIG. 1, and collapsed in FIG. 4. Other configurations are known in the art as well, and other configurations of the apparatus of the present invention could be readily adapted to such other configurations.

The air bag 2 bears against the rail wheel assembly 4 and against the vehicle frame 10 such that the vehicle frame 10 is supported on the rail wheel 6 by the air bag 2. Once the air bag 2 is pressurized, pressure is released from the hydraulic cylinder 12 so that same can float, allowing the vehicle frame 10 to move up and down with respect to the rail wheel 6 in response to motion of the vehicle along rails 16.

Figure 3:
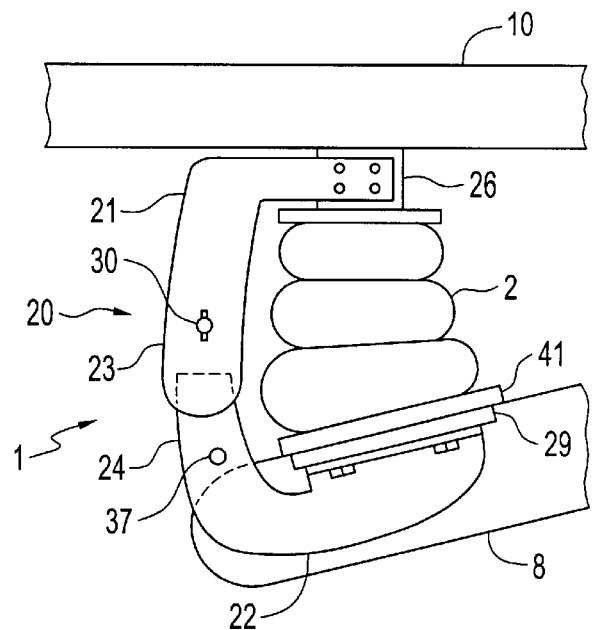
FIG. 3 is a side view of the apparatus of FIG. 2 in rail mode.

A stop mechanism 20 is attached to the vehicle frame 10 and to the rail wheel assembly 4. As seen in FIG. 3, the stop mechanism 20 is operative to allow the vehicle frame 10 to move down with respect to the rail wheel 6 only to a stopped position, illustrated in FIG. 3A. The adjacent road wheels 18 of the vehicle are above the rails 16 in the stopped position.

The stop mechanism 20 is further selectively operative to lock the rail wheel assembly 4 in the raised road mode position illustrated in FIG. 4.

In the illustrated embodiment of FIGS. 2, 3, 5, and 6, the stop mechanism 20 comprises first and second brackets 21, 22. One of the brackets 21, 22 is fixed to the rail wheel assembly 4 and the other is fixed to the vehicle frame 10. The brackets 21, 22 are oriented to move up and down beside and in proximity to each other.

As illustrated, the first bracket 21 comprises a pair of legs 23 and is attached to the air bag mounting member 26 extending down from the vehicle frame 10 above the air bag 2. The first bracket 21 is oriented such that the legs 23 extend downward adjacent to the air bag 2. The second bracket 22 is attached to an air bag mounting flange 29 extending out from the pivot arm 8 below the air bag 2. The second bracket 22 includes an arm 24 extending upward adjacent to the air bag 2 and is oriented such that the arm 24 moves up and down between the legs 23 of the first bracket 21. of course the first bracket 21 with legs 23 could be alternatively mounted below the air bag 2 with the legs 23 extending up instead of down, and the second bracket 22 mounted above the air bag 2 with the arm 24 extending down. The function would be the same.

Figure 3A:
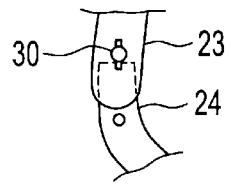
FIG. 3A is a side view of the brackets of the apparatus of FIG. 3 in the stopped position.

A stop member, illustrated as pin 30, is removably attached to the first bracket 21 by insertion through stop apertures 32 in the legs 23. When the vehicle frame 10 moves down to the stopped position, as illustrated in FIG. 3A, the top end of the second bracket 22 comes into contact with the pin 30 and prevents the vehicle frame 10 from moving further downward with respect to the rail wheel 6. In the stopped position, the adjacent road wheels 18 are above the rails 16. The stopped position is the lower end of an allowable range of up and down travel of the vehicle frame 10 with respect to the rail wheel 6. The vehicle is thus cushioned through that range, while at the same time prevented from falling to a level where the adjacent road wheels 18 hit the rails 16.

The first bracket 21 could also comprise a single leg 23, with the pin 30 extending through a stop aperture 32 therein and toward the second bracket 22, however the second leg 23 provides a stronger structure, supporting both ends of the pin 30. The two leg configuration provides a strong, simple stop mechanism 20. The legs 23 also prevent the arm 24 from bending away from the pin 30. With this embodiment, the vehicle can be driven on the rail wheel 6 while resting on the stop mechanism 20 in the event of an air bag failure, saving the considerable expense of remote repairs and down-time.

Figure 6:
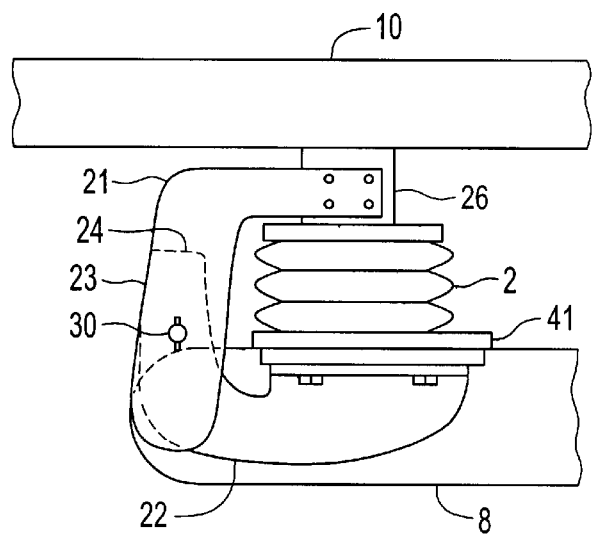
FIG. 6 is a side view of the apparatus of FIG. 2 in road mode.

In the illustrated embodiment of FIGS. 2, 3, 5, and 6 the stop mechanism 20 further comprises a lock 35 operative to selectively lock the first and second brackets 21, 22 together when the rail wheel 6 is in the raised road mode position, such that the rail wheel 6 is prevented from moving downward. The lock 35 comprises a lock aperture 37 defined by the second bracket 22 and oriented to coincide with the stop apertures 32 when the rail wheel 6 is in the raised road mode position as illustrated in FIG. 6, such that the pin 30 can be inserted through the stop apertures 32 and lock aperture 35.

Figure 7:
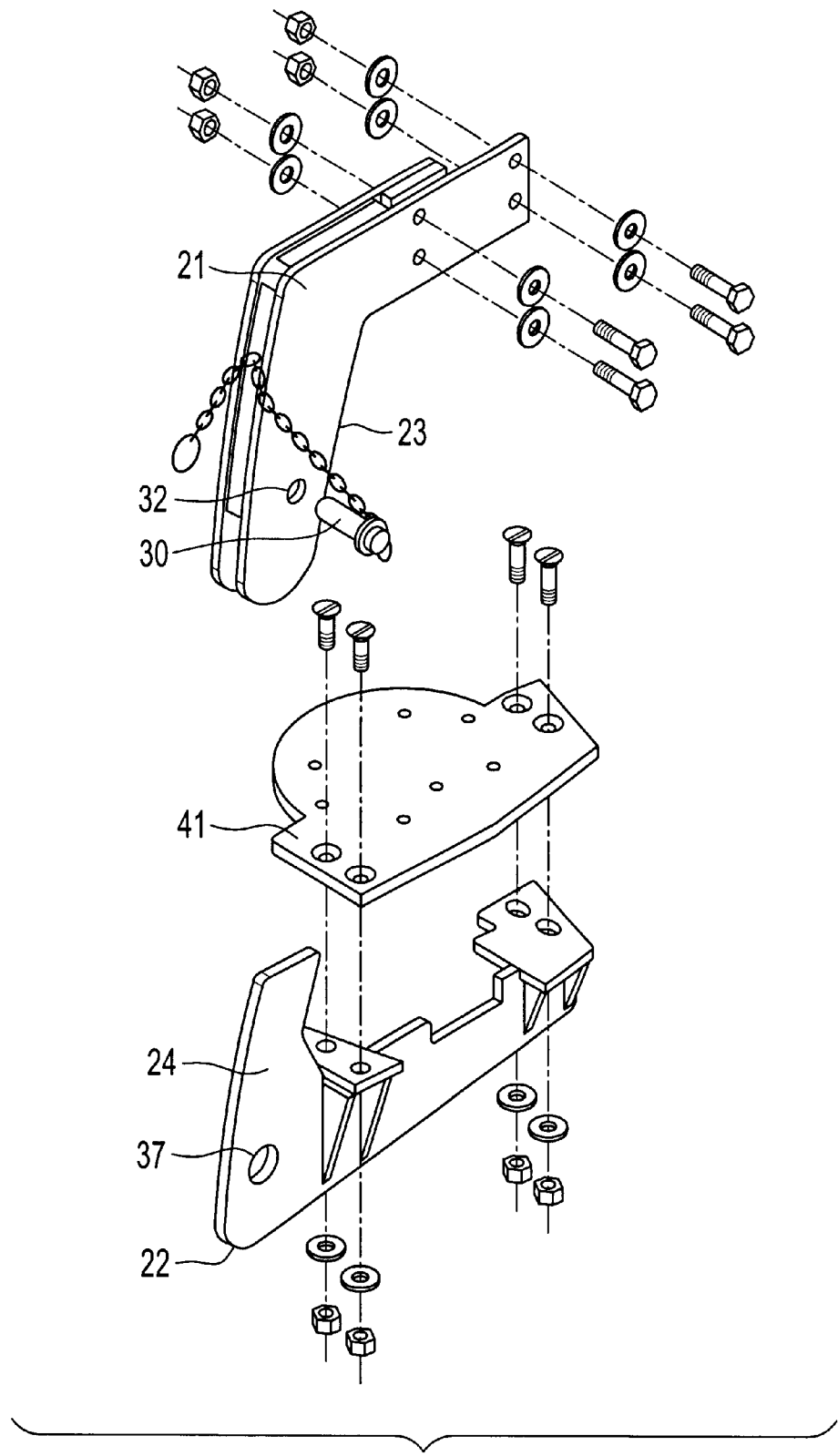
FIG. 7 is a perspective view of a kit for installing the apparatus of FIG. 2 on an existing suspension.

FIG. 7 illustrates the components of the illustrated embodiment in a kit form for installing the stop mechanism 20 on an existing suspension of the configuration illustrated in FIGS. 1 and 4. The kit includes a first bracket 21 attachable by bolts to the air bag mounting member 26. The air bag 2 is attached to an existing baseplate 40 at a lower end thereof. The kit includes a replacement baseplate 41. To attach the second bracket 22 to the rail wheel assembly 4, the existing baseplate 40 is removed and replaced by the replacement baseplate 41. Holes are drilled through the air bag mounting flange 29, and the second bracket 22 is bolted through these holes to the replacement baseplate 41.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

We claim:

1. For use with a road/rail vehicle, the vehicle convertible from a road mode for traveling on a road, to a rail mode for traveling on a set of rails, an apparatus for mounting a rail wheel to the vehicle, the apparatus comprising:

an air bag;

a source of pressurized fluid operatively connected to the air bag to supply pressurized fluid to the air bag such that the air bag bears against the rail wheel and against a vehicle frame such that the vehicle frame is supported on the rail wheel by the air bag and such that the vehicle frame can move up and down with respect to the rail wheel in response to motion of the vehicle along the set of rails;

a control operative to release pressurized fluid from the air bag;

an actuator operatively connected to the vehicle frame and to the rail wheel, the actuator operative to selectively move the rail wheel from a raised road mode position to a lowered rail mode position;

a stop mechanism attached to the vehicle frame and to the rail wheel, the stop mechanism operative to allow the vehicle frame to move down with respect to the rail wheel only to a stopped position, wherein adjacent road wheels of the vehicle are above the rails in the stopped position; and wherein the stop mechanism is selectively operative to lock the rail wheel in the raised road mode position.

2. For use with a road/rail vehicle, the vehicle convertible from a road mode for traveling on a road, to a rail mode for traveling on a set of rails, an apparatus for mounting a rail wheel to the vehicle, the apparatus comprising:

an air bag;

a source of pressurized fluid operatively connected to the air bag to supply pressurized fluid to the air bag such that the air bag bears against the rail wheel and against a vehicle frame such that the vehicle frame is supported on the rail wheel by the air bag and such that the vehicle frame can move up and down with respect to the rail wheel in response to motion of the vehicle along the set of rails;

a control operative to release pressurized fluid from the air bag;

an actuator operatively connected to the vehicle frame and to the rail wheel, the actuator operative to selectively move the rail wheel from a raised road mode position to a lowered rail mode position;

a stop mechanism attached to the vehicle frame and to the rail wheel, the stop mechanism operative to allow the vehicle frame to move down with respect to the rail wheel only to a stopped position, wherein adjacent road wheels of the vehicle are above the rails in the stopped position; and wherein the stop mechanism comprises:

first and second brackets, one of the brackets fixed to the rail wheel and the other fixed to the vehicle frame, the brackets oriented to move up and down beside and in proximity to each other;

a stop member removably attached to the first bracket, and extending toward the second bracket such that when the vehicle frame moves down to the stopped position the second bracket comes into contact with the stop member and prevents the vehicle frame from moving further downward with respect to the rail wheel.

3. The apparatus of claim 2 wherein the stop member comprises a pin extending through a stop aperture defined by the first bracket.

4. The apparatus of claim 3 wherein the first bracket comprises a pair of legs oriented such that the second bracket moves up and down between the legs, and wherein the pin extends through stop apertures in both legs.

5. The apparatus of claim 4 wherein the stop mechanism further comprises a lock operative to selectively lock the first and second brackets together when the rail wheel is in the raised road mode position, such that the rail wheel is prevented from moving downward.

6. The apparatus of claim 5 wherein the lock comprises a lock aperture defined by the second bracket, the lock aperture oriented to coincide with the stop apertures when the rail wheel is in the raised road mode position such that the pin can be inserted through the stop apertures and lock aperture.

7. The apparatus of claim 2 wherein the stop mechanism further comprises a lock operative to selectively lock the first and second brackets together when the rail wheel is in the raised road mode position, such that the rail wheel is prevented from moving downward.

8. A kit for use with a road/rail vehicle, the vehicle convertible from a road, mode for traveling on a road, to a rail mode for traveling on a set of rails, the vehicle when in rail mode supported on a rail wheel by an air bag, the vehicle including a source of pressurized fluid operatively connected to the air bag to supply pressurized fluid to the air bag such that the air bag bears against the rail wheel and against a vehicle frame and such that the vehicle frame can move up and down with respect to the rail wheel in response to motion of the vehicle along the set of rails, the vehicle further including a control to release the pressurized fluid from the air bag and an actuator operatively connected to the vehicle frame and to the rail wheel, the actuator operative to selectively move the rail wheel from a raised road mode position to a lowered rail mode position, the kit comprising:

a stop mechanism attachable to the vehicle frame and to the rail wheel, the stop mechanism operative to allow the vehicle frame to move down with respect to the rail wheel only to a stopped position wherein adjacent road wheels of the vehicle are above the rails; and wherein the stop mechanism is selectively operative to lock the rail wheel in the raised road mode position.

9. A kit for use with a road/rail vehicle, the vehicle convertible from a road mode for traveling on a road, to a rail mode for traveling on a set of rails, the vehicle when in rail mode supported on a rail wheel by an air bag, the vehicle including a source of pressurized fluid operatively connected to the air bag to supply pressurized fluid to the air bag such that the air bag bears against the rail wheel and against a vehicle frame and such that the vehicle frame can move up and down with respect to the rail wheel in response to motion of the vehicle along the set of rails, the vehicle further including a control to release the pressurized fluid from the air bag and an actuator operatively connected to the vehicle frame and to the rail wheel, the actuator operative to selectively move the rail wheel from a raised road mode position to a lowered rail mode position, the kit comprising:

a stop mechanism attachable to the vehicle frame and to the rail wheel, the stop mechanism operative to allow the vehicle frame to move down with respect to the rail wheel only to a stopped position wherein adjacent road wheels of the vehicle are above the rails, and wherein the stop mechanism comprises:

first and second brackets, one of the brackets attachable to the rail wheel and the other attachable to the vehicle frame such that the brackets are oriented to move up and down beside and in proximity to each other;

a stop member removably attached to the first bracket, and extending toward the second bracket such that when the vehicle frame moves down to the stopped position the second bracket comes into contact with the stop member and prevents the vehicle frame from moving further downward with respect to the rail wheel.

10. The kit of claim 9 wherein the stop member comprises a pin extending through a stop aperture defined by the first bracket.

11. The kit of claim 10 wherein the first bracket comprises a pair of legs oriented such that the second bracket moves up and down between the legs, and wherein the pin extends through stop apertures in both legs.

12. The kit of claim 11 wherein the stop mechanism further comprises a lock operative to selectively lock the first and second brackets together when the rail wheel is in the raised road mode position, such that the rail wheel is prevented from moving downward.

13. The kit of claim 12 wherein the lock comprises a lock aperture defined by the second bracket, the lock aperture oriented to coincide with the stop apertures when the rail wheel is in the raised road mode position such that the pin can be inserted through the stop apertures and lock aperture.

14. The kit of any one of claims 11, 12, or 13 wherein the first bracket is attachable to a rail wheel assembly at a point below the air bag such that the legs extend upward adjacent to the air bag, and wherein the second bracket is attachable to the vehicle frame at a point above the air bag, and wherein the second bracket includes an arm extending downward adjacent to the air bag.

15. The kit of claim 14 wherein the air bag is attached to an existing baseplate at a lower end thereof, and wherein the kit further comprises a replacement baseplate, and wherein the first bracket is attached to the rail wheel assembly by replacing the existing baseplate with the replacement baseplate.

16. The kit of claims 11, 12, or 13 wherein the first bracket is attachable to the vehicle frame at a point above the air bag such that the legs extend downward adjacent to the air bag, and wherein the second bracket is attachable to a rail wheel assembly at a point below the air bag, and wherein the second bracket includes an arm extending upward adjacent to the air bag.

17. The kit of claim 16 wherein the air bag is attached to an existing baseplate at a lower end thereof, and wherein the kit further comprises a replacement baseplate, and wherein the second bracket is attached to the rail wheel assembly by replacing the existing baseplate with the replacement baseplate.

18. The kit of claim 9 wherein the stop mechanism further comprises a lock operative to selectively lock the first and second brackets together when the rail wheel is in the raised road mode position, such that the rail wheel is prevented from moving downward.

* * * * *